US 7,108,324 B2

(12) United States Patent
Lambrecht et al.

(10) Patent No.: US 7,108,324 B2
(45) Date of Patent: Sep. 19, 2006

(54) VEHICLE SEAT ADJUSTER

(75) Inventors: Stephen Lambrecht, New Hudson, MI (US); Gregory S. Fraley, Farmington Hills, MI (US); John R. Sims, Dearborn, MI (US)

(73) Assignee: Lear Corporation, Southfield, MI (US)

( * ) Notice: Subject to any disclaimer, the term of this patent is extended or adjusted under 35 U.S.C. 154(b) by 358 days.

(21) Appl. No.: 10/186,167

(22) Filed: Jun. 28, 2002

(65) Prior Publication Data
US 2004/0113474 A1 Jun. 17, 2004

(51) Int. Cl.
*A47C 1/02* (2006.01)

(52) U.S. Cl. .................................... 297/344.1

(58) Field of Classification Search ............. 297/216.1, 297/216.15, 216.16, 362.13, 344.1, 284.1, 297/284.2, 284.6, 180.1; 296/65.1, 65.01; 248/429, 430; 91/462; 92/8, 9, 12
See application file for complete search history.

(56) References Cited

U.S. PATENT DOCUMENTS

| 3,024,067 | A | * | 3/1962 | Brandoli |
| 3,150,898 | A | * | 9/1964 | Knudson |
| 3,246,868 | A | * | 4/1966 | Martens et al. |
| 3,711,054 | A | * | 1/1973 | Bauer .......................... 248/562 |
| 3,837,704 | A | * | 9/1974 | Bauer ....................... 297/344.19 |
| 4,408,800 | A | * | 10/1983 | Knapp ........................ 297/301.2 |
| 4,720,143 | A | | 1/1988 | Schwartz et al. |
| 4,871,149 | A | * | 10/1989 | Dony et al. ............... 267/64.12 |
| 4,930,403 | A | * | 6/1990 | Husted .......................... 91/443 |
| 5,090,770 | A | * | 2/1992 | Heinrichs et al. |
| 5,382,075 | A | * | 1/1995 | Shih ....................... 297/180.14 |
| 5,427,345 | A | | 6/1995 | Yamakami et al. |
| 5,435,625 | A | | 7/1995 | Weber |
| 5,542,336 | A | * | 8/1996 | Larkin .......................... 91/166 |
| 5,562,324 | A | * | 10/1996 | Massara et al. .......... 297/284.6 |
| 5,567,013 | A | * | 10/1996 | Chang ................. 297/344.1 X |
| 5,575,150 | A | * | 11/1996 | Vieten et al. .................. 60/476 |
| 5,613,733 | A | | 3/1997 | Miller, Sr. et al. |
| 5,623,861 | A | * | 4/1997 | Ward et al. .................... 91/420 |
| 5,638,676 | A | * | 6/1997 | Muller ........................ 60/407 |
| 5,779,312 | A | * | 7/1998 | Nagai et al. ............ 297/362.13 |
| 5,816,131 | A | * | 10/1998 | Tornatore ..................... 91/169 |
| 5,913,810 | A | * | 6/1999 | Andre .......................... 60/420 |
| 6,082,243 | A | * | 7/2000 | Schmucker et al. .......... 91/392 |
| 6,193,313 | B1 | | 2/2001 | Jonsson |
| 6,199,820 | B1 | * | 3/2001 | Ritchie ....................... 248/550 |
| 6,206,153 | B1 | * | 3/2001 | Popjoy ....................... 188/300 |

* cited by examiner

*Primary Examiner*—Milton Nelson, Jr.
(74) *Attorney, Agent, or Firm*—MacMillan, Sobanski & Todd, LLC

(57) ABSTRACT

A pneumatic seat adjuster for moving a vehicle seat relative to a floor of the vehicle includes a body having a bore formed therein. The body is adapted to be connected to one of a floor and a vehicle seat. A piston is slidably disposed in the bore of the body. The piston and the body define first and second chambers. The piston is adapted to be connected to the other one of the floor and the vehicle seat. The seat adjuster further includes a source of pressurized gas and a valve for selectively supplying pressurized gas from the source into the first and second chambers for altering the pressure differential between the first and second chambers, thereby moving the piston relative to the body.

20 Claims, 3 Drawing Sheets

VEHICLE SEAT ADJUSTER

FIELD OF THE INVENTION

This invention relates in general to a seat track assembly for a vehicle, and in particular to a seat track assembly that is adjustable in a fore or aft direction by a pneumatically controlled device.

BACKGROUND OF INVENTION

Most vehicle seats, particularly in passenger vehicles, are generally provided with adjustment mechanisms to allow the occupant to position the seat for optimal comfort. A vehicle seat typically includes a seat back that is pivotably mounted to a seat bottom. Many vehicle seats also include a recliner mechanism to adjust the angle of the seat back relative to the seat bottom. Vehicle seats can also include mechanisms that allow movement of the seat forward and backward (fore and aft) relative to the floor of the vehicle. To accomplish this, vehicle seats are mounted on seat track assemblies that are in turn supported on the vehicle frame. Seat track assemblies conventionally include an upper seat track and a lower seat track with a low-friction member or surface between the tracks. The seat bottom is typically connected to the upper seat track and can slidably move relative to the lower track by sliding on the low friction surface. The lower seat track is generally fixed to the vehicle frame or floor of the vehicle.

It is common for such vehicle seat adjustment to be accomplished by manually or electronically controlled mechanical devices such as gears, screws, and bell cranks. The limitations of manually controlled seat adjusters is that there are a finite number of positions or stops along a seat track in which the seat can be positioned. These systems also commonly require an individual to reach down to the side or bottom of a seat to activate the release mechanism for adjustment. With electronically controlled systems, a motor generally is used to operate a rack and pinion or gear system to cause movement of the seat. While this system allows for greater distance control than with a manual system, there is still the potential for uneven gear meshing and motor noise.

BRIEF SUMMARY OF THE INVENTION

This invention relates to a pneumatic seat adjuster for moving a vehicle seat relative to a floor of the vehicle. The seat adjuster includes a body having a bore formed therein. The body is adapted to be connected to one of a floor and a vehicle seat. A piston is slidably disposed in the bore of the body. The piston and the body define first and second chambers. The piston is adapted to be connected to the other one of the floor and the vehicle seat. The seat adjuster further includes a source of pressurized gas and a valve for selectively supplying pressurized gas from the source into the first and second chambers for altering the pressure differential between the first and second chambers, thereby moving the piston relative to the body.

Various objects and advantages of this invention will become apparent to those skilled in the art from the following detailed description of the preferred embodiment, when read in light of the accompanying drawings.

DETAILED DESCRIPTION OF THE PREFERRED EMBODIMENT

Figure 1:
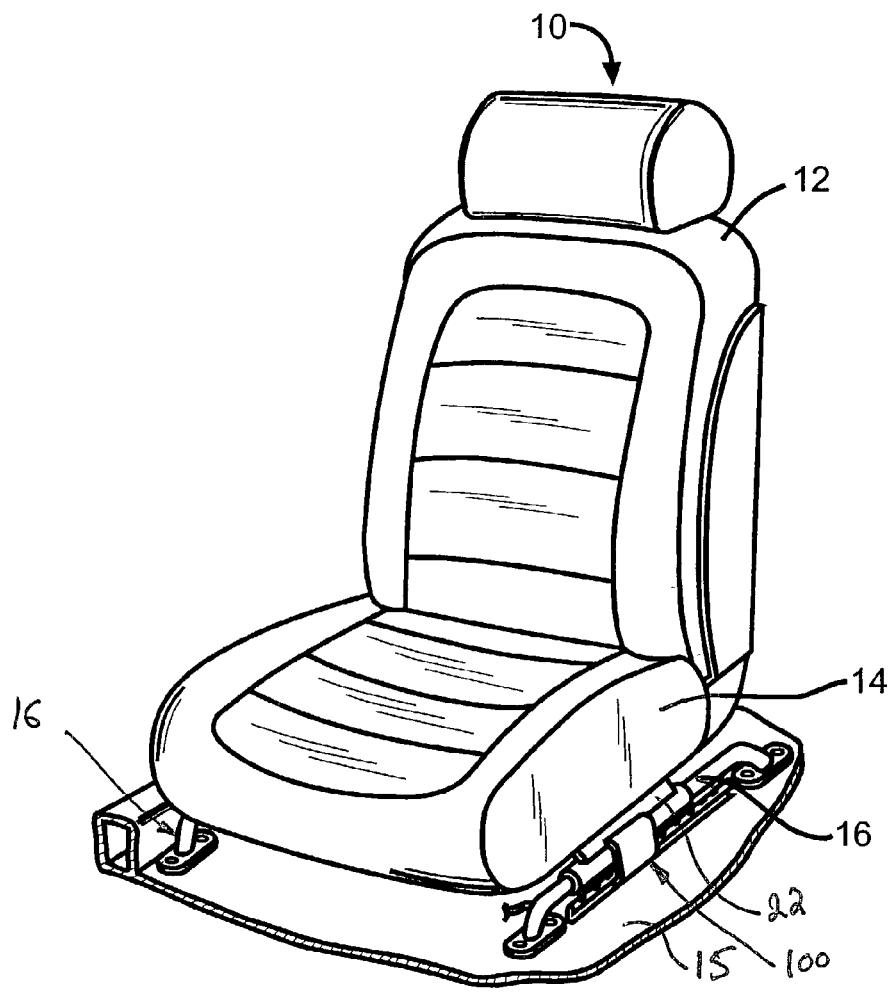
FIG. 1 is a perspective view of a vehicle seat supported on an adjustable seat track assembly.

Referring now to the drawings, there is illustrated in FIG. 1 a vehicle seat indicated generally at 10. The vehicle seat 10 has a seat back 12 and a seat bottom 14. The seat bottom 14 can be slidably mounted relative to the vehicle frame or floor 15 by a seat track adjuster or assembly 16, in accordance with the present invention. The seat track assembly 16 can be connected to the vehicle floor or to any suitable portion of the vehicle, such as a frame member, by any suitable means, such as by threaded fasteners. As will be explained below, the seat track assembly 16 has first and second portions movable relative to another for moving the seat 10 relative to the floor of the vehicle. The first portion is operatively connected to the floor 15 of the vehicle, or any other structure member, and the second portion is operatively connected to the seat 10. This allows the vehicle seat 10 to slidably move fore and aft relative to the vehicle floor 15 such that a seat occupant can position the seat 10 a desired distance from the vehicle instrument panel, steering wheel, and foot pedals (not shown) or position the seat 10 for maximum comfort. Preferably, the vehicle seat 10 has a pair of seat track assemblies 16, one for each side of the seat 10. It is understood, however, that the seat 10 can include any number of seat track assemblies 16, such as a single seat track assembly 16 that would preferably be located near the center of the seat bottom 14. It should also be understood that the seat track assembly 16 may be oriented in a position other than that shown in the figures.

Figure 2:
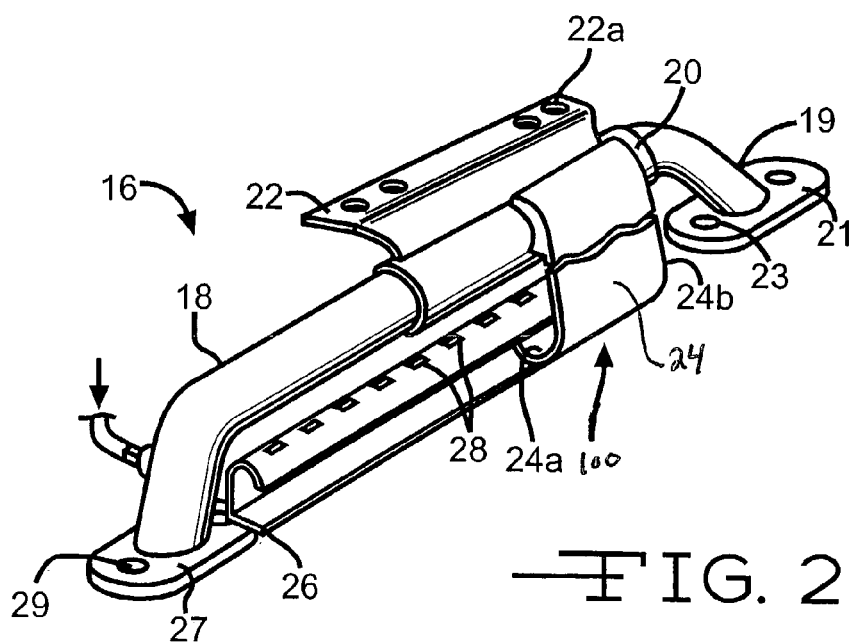
FIG. 2 is a perspective view of a vehicle seat adjuster mechanism in accordance with the invention.
Figure 3:
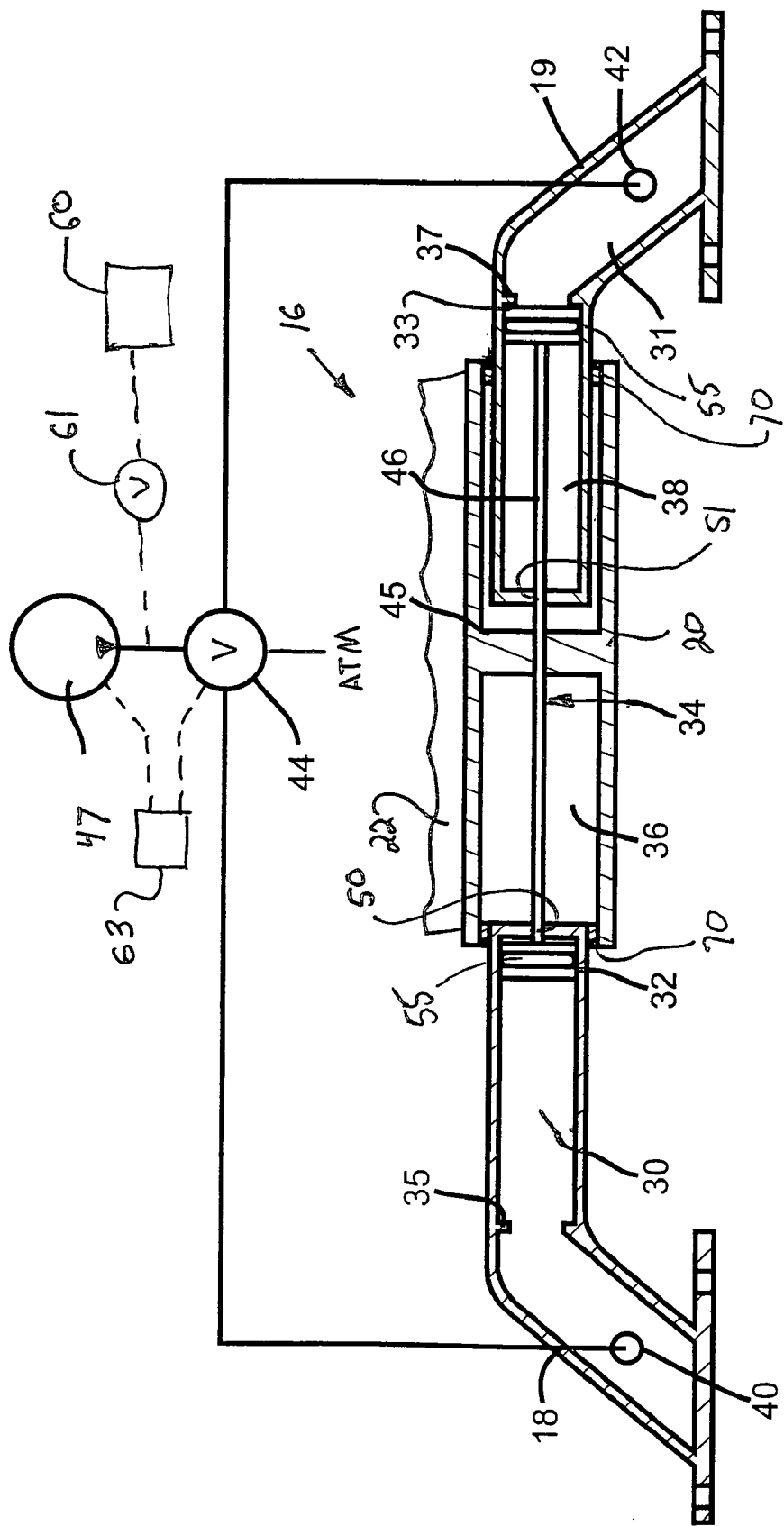
FIG. 3 is a longitudinal cross-sectional view of the vehicle seat adjuster mechanism illustrated in FIG. 2.

Referring now to FIGS. 2 and 3, a vehicle seat track assembly 16 is illustrated. A cylinder 20 is slidingly engaged with a first body or track member 18 and a second body or track member 19. The first track member 18 is preferably generally hollow thereby generally defining an internal chamber 30. The first track member 18 is also preferably fixedly connected at one end to the vehicle floor 15 by any conventional means. For example, the first track member 18 may have a flange 27 with an aperture 29 formed therethrough for receiving a fastener (not shown) connecting the end of the first track member 18 to the vehicle floor 15. The second end of the first track member 18 includes an opening 50 formed therein and is adapted to be received within an end portion of the cylinder 20 in a manner that will be described in greater detail below. The second track member 19 is similar in function and structure as the first track member 18 and is also preferably generally hollow defining a chamber 31 therein and is fixedly connected to the vehicle floor 15 at a flanged end 27 of the first track member 18. It is anticipated that the flanged end 21 of the second track member 19 will be connected to the vehicle in a similar manner to that of the first track member flanged end 27 via an aperture 23. The second end of the second track member 19 includes an opening 51 and is also engaged with the sliding cylinder 20 in a manner that will be described in greater detail below. The first and second track members 18, 19 also comprise first and second ports 40 and 42, respectively, which are in communication with the chambers 30 and 32, respectively, the purpose of which will be described in greater detail below.

As best illustrated in FIG. 2, the cylinder 20 also preferably includes a flange 22 that is adapted to be connected to a vehicle seat bottom 14 such that the seat 10 slidably moves with the cylinder 20 relative to the track members 18, 19. The flange 22 can have a plurality of apertures 22*a* formed therethrough to allow fasteners (not shown) to be used to connect the seat bottom 14 to the flange 22. However, it is understood that the seat bottom 14 can be connected to the cylinder 20 by any suitable means.

As is more clearly shown in FIG. 3, the cylinder 20 is an open ended tube formed having a pair of cavities 36, 38 separated by a centrally located wall 45. Within the cylinder 20 is a piston assembly, indicated generally at 34, which is slidably disposed within the hollow cavities 36, 38 of the cylinder 20. The piston 34 has a first piston end 32 slidably disposed within the hollow chamber 30 of the first track member 18 and a second piston end 33 slidably disposed within the hollow chamber 31 of the second track member 19. The piston 34 includes a rod 46 extending between and connected to the piston ends 32 and 33. The rod 46 is connected to the wall 45 of the cylinder 20 such that the cylinder 20 and the piston assembly 34 are coupled together.

As is shown in FIG. 3, the cavities 36 and 38 of the cylinder 20 are adapted to receive the ends of the track members 18, 19 such that when the cylinder 20 slides forward, for example leftward as viewing FIG. 3, the end of the first track member 18 is received within the first cavity 36. In an alternate embodiment, the piston 34 can be a generally elongated cylinder having a continuous body portion with closed first and second ends defining a first and second piston face such that the cylinder is disposed in the chambers 30 and 31 of the track members 18 and 19. The piston 20 can be hollow or solid.

Each piston end 32, 33 is preferably sized such that the outer circumference of each piston end 32, 33 is in sliding engagement with the respective walls of the first and second chambers 30, 31 of the track members 18, 19. It is further preferred that the piston ends 32, 33 are adapted to sealingly engage the inner surface of the bore or chamber walls 32, 33 such that when a gas or fluid is introduced into one of said chambers 30, 31 the fluid is prevented from traveling past the respective piston end 32, 33. Such a sealing engagement can be accomplished by positioning an O-ring 55 about the outer circumference of the piston ends 32, 33. The piston end 32, 33 may include a recess on the outer surface of each end 32, 33 to receive a portion of a lip seal or O-ring, with the seal also engaging the inner wall of the chambers 30, 31. Any other sealing method can also be used to accomplish such a sealing arrangement between the piston end 32, 33 and the chamber walls. The adjuster 10 also preferably includes sealing structures 70, such as lip seals or O-rings, for providing a sealing engagement between the outer surface of the ends of the first and second track members 18 and 19, and the inner surface of the ends of the cylinder 20.

To adjust the fore and aft position of the seat 14, the piston 34 is adapted to slide within the first and second chambers 30, 31 based on a pressure differential relative to the first and second chamber 30, 31 by gas entering one or both of the chambers 30, 31. Alternatively, a pressure differential can be created by venting gas from one chamber 30, 31 while maintaining pressure in the other chamber 31, 30, or some combination of increasing or decreasing pressure in a first chamber 30, 31 while venting fluid and decreasing or increasing pressure in a second chamber 31, 30. In such an instance, the pressure will act upon the first or second piston end 32, 33 thereby forcing the piston body 34 in a direction opposite the piston end 32, 33 that is being acted upon. The movement of the piston 34 will cause the cylinder 20 and the flange 22 to travel therewith, thereby moving the seat 14 relative to the vehicle floor 15. It is noted that the interior of the first track member 18 and the end 32 of the piston 34 define the chamber 30. The interior of the second track member 19 and the end 33 of the piston 34 define the chamber 31.

It is preferred that a source of pressurized gas 47 be connected to the first port 40 and second port 42 of the first and second track members 18, 19 respectively, via the valve 44. The source 47 can be controlled to supply pressurized gas into the ports 40 and 42 of the first or second track member chambers 30, 31, by any suitable manner. The pressurized gas will create a pressure differential in the chambers 30 and 31 and act upon a piston end 32 or 33 causing the piston 34 to slide from a starting position to a position that is further fore or aft, depending on the chamber 30, 31 to which the pressurized fluid is supplied.

The source of pressurized gas 47 can be any suitable pressure generator or storage device for maintaining a relatively high pressure level of gas compared to atmospheric pressure for what is required to appropriately move the seat 14. For example, the source 47 can be a pneumatic pump which also may be used to inflate other pneumatic devices 60 in the vehicle via a valve 61. Examples of other pneumatic devices 60 include air bladders for bolster or other seat contour altering mechanisms, or ventilation mechanisms for providing ventilation through apertures formed in the trim material of the surface of the seat. Preferably, the seat adjuster mechanism is pneumatic in that a gas, air, vapor, or other generally compressible fluids are used as the working fluid in chambers 30 and 31 to create a pressure differential. Thus, the term "gas" as used herein refers to air, vapor, or other generally compressible fluids. The source 47 may also include a pump and a storage accumulator.

The valve 44 can be any suitable valve structure or plurality of valves which are operable, such as by electronic or manual controls, which can regulate the supply of gas from the source 47 and direct it through the appropriate ports 40 and 42. The valve 44 also preferably is capable of venting the chambers 30 and 31 to atmosphere, as shown in FIG. 3, to decrease the pressure within the chambers 30, 31. Thus, the seat adjuster can be an open loop system. The system could also be a closed loop system in which the gas is not vented but transferred from one chamber 30, 31 to the other, or stored in a reservoir or storage device (not shown).

To maintain the position of the piston 34 relative to the first and second track members 18, 19, the pressure between the two chambers 30, 31 of the first and second track members 18, 19 may be approximately the same. In a preferred embodiment, both chambers 30, 31 are supplied independently with a pressurized gas. The pressurized gas can be transferred or vented through the ports 40 or 42 of either the first or second track member 18, 19. For example, if the piston 34 is moved forward or leftward, as viewing FIG. 3, the valve 44 can be activated to release some of the fluid within the chamber 30. The same is also true for the second track member valve 42 if the seat 10 is to be moved aft. Once the cylinder 20 reaches the desired position, the valve 44 can be deactivated so that the pressure differential between the first and second track member chambers 30, 31 becomes substantially zero.

Although the seat adjuster is described as being a pneumatic system, the adjuster can be hydraulically operated with generally incompressible fluids. If the pressurized working fluid is gas, the ports 40, 42 can vent to the atmosphere. If hydraulic, the system can include a reservoir (not shown) to collect the vented fluid. In this embodiment, the vented fluid can then be reintroduced into the source 47 to maintain the amount of fluid in the system and prevent waste.

As shown in FIG. 3, a stopping surface 35 preferably is included within the interior of the first track member 18 in order to control the distance the piston 34 can move within a chamber. Preferably, each track member 18 and 19 includes a stopping surface 35 and 37, respectively. The stopping surface 35, 37 can be sized or shaped such that effect is of a reduced diameter portion of the inner walls of the chamber 30, 31. This will prevent each piston end 32, 33 from passing beyond the reduced diameter portions 35, 37, respectively, thereby limiting the motion of the seat 10 relative to the seat track assembly 16. There is preferably a stopping surface 35, 37 located within each chamber 30, 31 such that motion of the piston body 34 is limited in a first direction by a reduced diameter portion 35 within the first chamber 30 and the motion is limited in a second direction by a reduced diameter portion 37 within the second chamber 31. The stopping surfaces 35, 37 can also comprise a solid wall positioned in each of the respective chambers 30, 31. However, in such a case, the valves 40, 42 will preferably be positioned relative to the stopping wall such that gas communication is maintained between the chambers 30, 31 such that gas can be added to or vented from the chambers 30, 31 without interference from the solid stopping surface.

The piston ends 32, 33 and piston 34 are preferably further positioned within the cylinder 20 as described above, wherein the cylinder 20 encloses the area between the first and second track members 18, 19. The cylinder 20 is also preferably in sliding engagement with the outer surface of the first and second track members 18, 19 such that at either of the furthest longitudinal positions of the cylinder 20 (fore or aft), the piston 34 is not exposed to outside elements. The cylinder 20 can also be used to limit the maximum longitudinal position of the piston body 34 in a first and second direction by having a stopping surface (not shown) on the inner surface of the cylinder 20 or on the outer surface of the track members 18, 19. The stopping surface can be a projection that extends from one side of the inner surface of the cylinder 20, a ridge that extends around the inner diameter of the cylinder, or a continuous rib that separates the inner portion of the cylinder into two cavities 36, 38 (as shown in FIG. 3). At one of the furthest longitudinal positions of the cylinder, the rib or ridge will abut the second ends of either the first or second track members 18, 19 thereby limiting further longitudinal motion of the cylinder 20 relative to the track members 18, 19.

It is preferred that the seat 10 does not change position relative to the vehicle floor 15 during non-adjustment of the seat 10 via the seat adjuster 16. Therefore, the pneumatic seat adjuster described above can also operate as a pneumatic locking mechanism. To prevent movement of the cylinder 20 relative to the first and second track members 18 and 19, high pressure can be introduced into both chambers 30 and 31 to generally prevent movement. However, because the gas within the chambers 30 and 31 is generally compressible, slight movement may occur under high acceleration or deceleration events. Alternatively, when a deceleration or acceleration event occurs, a detection system, indicated schematically at 63 in FIG. 3, can operate the source 47 of pressurized gas to supply gas at an increased pressure to both chambers 30, 31 to ensure that the pressure differential in the chambers 30, 31 is zero as well as increasing the overall pressure applied to both piston ends 32, 33.

Alternatively, the valve 44 can be operated by the detection assembly 63 to dampen movement of the seat 10 relative to the vehicle in order to absorb some of the forces caused by the hard-stop event. To accomplish this dampening, the valve 44 would permit a controlled movement of the seat 10 by altering the pressures within the chambers 30 and 31. Preferably, the dampening generally dissipates or manages energy relative to time to help minimize collision or rapid acceleration or deceleration forces experienced by the occupants of the vehicle seat 10. The valve 44 would manage the motion of the seat 14 and occupant through a duration of time, thereby reducing peak forces on the occupant to help reduce head and neck injury, for example. Preferably, the valve 44 is actively controlled during the acceleration or deceleration event so that the energy dissipating rates of the seat 10 can be altered depending on various factors, such as for example, the severity of the impact forces, weight of the vehicle, vehicle speed, and the weight and position of the vehicle occupant. Upon sudden deceleration or acceleration, such as in an impact, the seat 10, and therefore the cylinder 20 is subjected to a translation movement relative to the first and second track members 18 and 19. This movement causes the piston 34 to translate relative to the track members 18 and 19. Energy can be dissipated and/or managed through the movement of the cylinder 20 due to the damping characteristics of the pneumatic cylinder seat assembly 16. For example, in a forward impact situation, the seat 10 is urged forward, leftward as viewing FIG. 3, due to the center of mass of the seat 10 and the occupant. The seat 10 may include a safety restraint or belt (not shown) which restrains the occupant relative to the seat 10. As the seat 10 is urged forward, the cylinder 20 is urged toward the first track member 18. The valve 44 can be actuated to increase (or decrease) the pressure differential of the chambers 30 and 31 to reduce movement of the cylinder 20 relative to the first and second track members 18, 19. It is generally desirable to translate the seat 10 a predetermined translational length regardless of the severity of the impact forces. For relatively large impact forces, the seat track assembly 16 should accept a large load within its translation. Contrary, for relatively small impact forces, the seat track assembly 16 should accept a small load within its translation.

Figure 4:
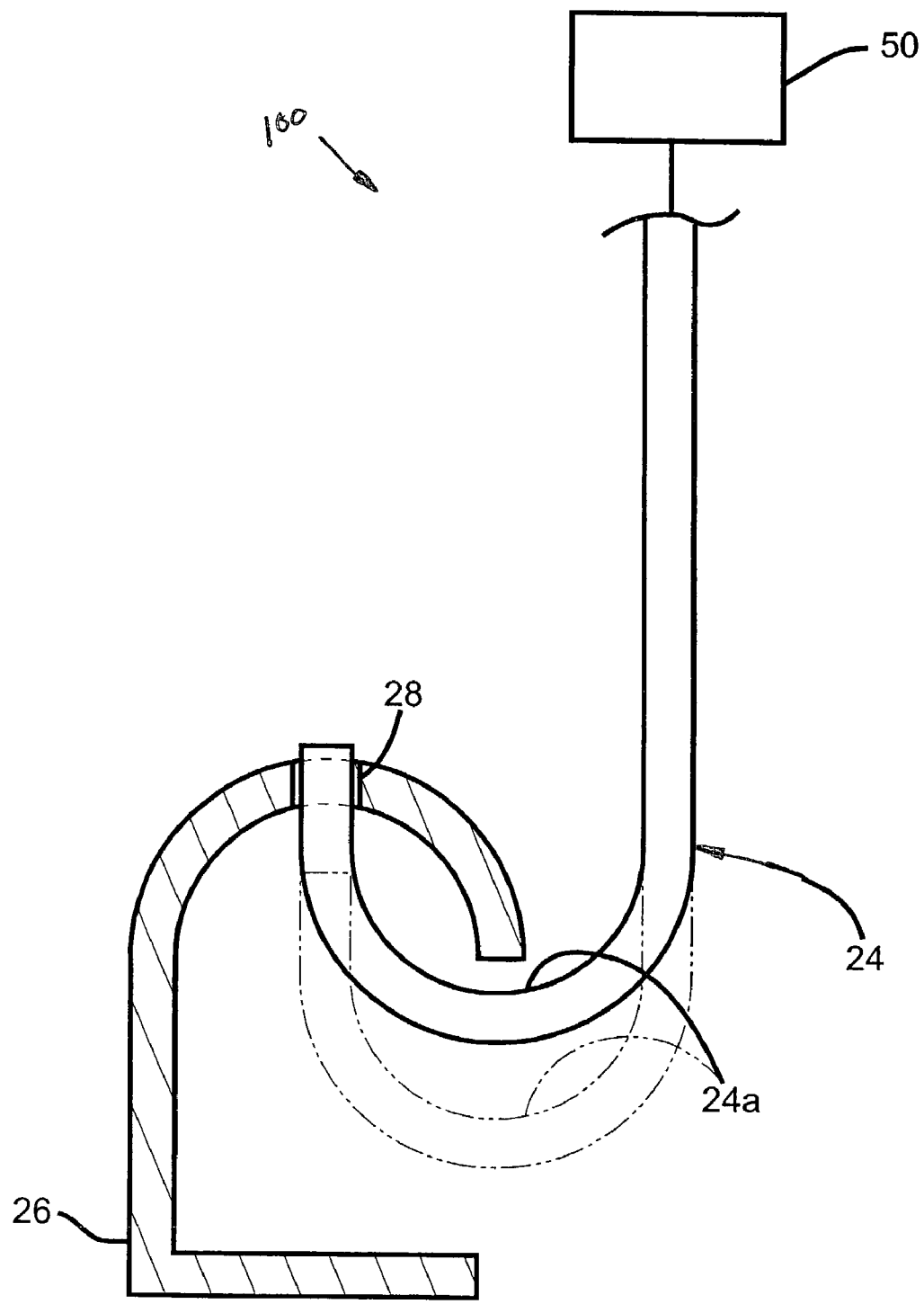
FIG. 4 is a cross-sectional view of a locking track member with a mechanical lock mechanism adapted to be engaged therewith.

In an alternate embodiment, the adjuster 16 includes a mechanical locking mechanism in which by means of friction or other physical engagement, a mechanical connection prevents the fore and aft movement of the seat 10 relative to the floor 15. There is illustrated in FIGS. 2 and 4, an embodiment of a mechanical locking mechanism, indicated generally at 100. The mechanism includes an arm 24 extending from the cylinder 20 to engage a locking track member 26. Preferably, the arm 24 has a plurality of fingers 24a extending therefrom adapted to engage apertures 28 formed in the locking track member 26. The locking track member 26 is preferably positioned along the same translational axis as the first and second track members 18, 19 and is also preferably attached to the vehicle frame. However it should be understood that the arm 24 and the locking track member 26 can be positioned in any manner to provide a mechanical locking arrangement.

The locking mechanism 100 can be configured to by actively or passively controlled. For example, the fingers 24a of the arm 24 could be manually or electrically positioned via an actuator 50 connected to the arm 24 to move upward from the phantom position 24a as shown in FIG. 4 to its solid position, such that the fingers 24a engage in the apertures 28. When in an engaged or locked position, such as during a hard-stop event, the fingers 24a of the arm 24 engage the apertures 28 in the locking track member 26 to help prevent fore or aft motion of the seat 10 and provide additional support for the cylinder 20. While in a non-engaged position, as shown by the phantom lines 24a of FIG. 4, the arm 24 is not in contact with the locking track member 26.

As best shown in FIG. 4, the locking track member 26 is stationary relative to the seat 10. As the seat 10 slides along the first and second track members 18, 19 the cylinder 20, and therefore the arm 24, slide therewith. Also as shown in FIG. 4, the arm 24 and the locking track member 26 are a pair of opposed "J"-shaped members.

Alternatively, the locking mechanism 100 can be used as a passive or back-up system in the event that there is failure in the primary system or during an impact condition. For example, during normal operating conditions of the seat, the fingers 24a may never engage the apertures 28. Once a relatively large impact force is exerted on the seat, such as during a frontal impact, the flange 22 may move upwardly causing the arm 24 to rotate clockwise, as viewing FIG. 4. Rotation of the arm 24 would cause the fingers 24a to move upward into engagement with the apertures 28, thereby locking movement of the seat.

The actuator 50 can be any suitable electrically or mechanically operated mechanism which moves the fingers 24a into and out of engagement with the apertures 28. The mechanical locking mechanism can be used in conjunction with the pneumatic locking system described above (zero pressure differential between the chambers 30, 31).

The principle and mode of operation of this invention have been explained and illustrated in its preferred embodiment. However, it must be understood that this invention may be practiced otherwise than as specifically explained and illustrated without departing from its spirit or scope.

What is claimed is:

1. A pneumatic seat adjuster for moving a vehicle seat relative to a floor of the vehicle, said seat adjuster comprising:
   a body having a bore formed therein, the body adapted to be connected to one of a floor and a vehicle seat;
   a piston slidably disposed in said bore, said piston and said body defining first and second chambers, the piston adapted to be connected to the other one of the floor and the vehicle seat;
   a source of pressurized gas;
   a valve for selectively supplying pressurized gas from said source into said first and second chambers for altering a pressure differential between said first and second chambers to cause movement of said piston relative to said body; and
   a mechanical locking mechanism for preventing the movement of said body relative to said piston;
   wherein said valve selectively supplies pressurized gas from said source into said first and second chambers, and wherein said valve selectively vents gas from said first and second chambers for altering the pressure differential between said first and second chambers.

2. The seat adjuster of claim 1, wherein said valve is operable to control the motion of said body relative to said piston through a duration of time during rapid acceleration of the seat adjuster to reduce peak acceleration forces acting on the seat.

3. The seat adjuster of claim 1, wherein said valve selectively vents gas from said first and second chambers to atmosphere for altering the pressure differential between said first and second chambers.

4. The seat adjuster of claim 1 further including a pneumatic device pneumatically connected to said source of pressurized gas.

5. The seat adjuster of claim 4, wherein said pneumatic device is an air bladder for altering the contour of the vehicle seat.

6. The seat adjuster of claim 4, wherein said pneumatic device is a ventilation mechanism.

7. A vehicle seat adjuster comprising:
   a first seat track member defining a first internal chamber;
   a second seat track member defining a second internal chamber;
   a cylinder having first and second piston ends, said first end disposed in said first chamber, said second end disposed in said second chamber, wherein said cylinder is slidingly engaged with the first and second tracks, said cylinder defining a pair of opposed cavities, said cavities further including a piston having first and second ends positioned between said cavities, said cylinder adapted to be connected to a vehicle seat;
   a valve for selectively supplying pressurized gas into said first and second chambers for altering a pressure differential between the said first and second chambers to cause movement of said cylinder relative to said first and second track members; and
   a source of pressurized gas connected to said valve;
   wherein said valve selectively supplies pressurized gas from said source into said first and second chambers, and wherein said valve selectively vents gas from said first and second chambers for altering the pressure differential between said first and second chambers.

8. The vehicle seat adjuster of claim 7, wherein said valve selectively vents gas from said first and second chambers to atmosphere for altering the pressure differential between said first and second chambers.

9. The vehicle seat adjuster defined in claim 7 further comprising a pneumatic device pneumatically connected to said source of pressurized gas.

10. The vehicle seat adjuster of claim 9, wherein said pneumatic device is an air bladder for altering a contour of the vehicle seat.

11. The vehicle seat adjuster of claim 9, wherein said pneumatic device is a ventilation mechanism.

12. A pneumatic system for a vehicle seat mounted on a floor of a vehicle comprising:
   a seat adjuster including a body having a bore formed therein, the body adapted to be connected to one of a floor and a vehicle seat; and a piston slidably disposed in said bore, said piston and said body defining first and second chambers, the piston adapted to be connected to the other one of the floor and the vehicle seat;
   a source of pressurized gas;
   a first valve for selectively supplying pressurized gas from said source into said first and second chambers for altering a pressure differential between said first and second chambers to cause movement of said piston relative to said body;
   a pneumatic device; and
   a second valve for selectively supplying pressurized gas from said source to said pneumatic device.

13. The pneumatic system of claim 12, wherein said first valve selectively vents gas from said first and second chambers to atmosphere for altering the pressure differential between said first and second chambers.

14. The pneumatic system of claim 12, wherein said pneumatic device is an air bladder for altering the contour of the vehicle seat.

15. The pneumatic system of claim 12, wherein said pneumatic device is a ventilation mechanism.

16. The pneumatic system of claim 12 further including a mechanical locking mechanism for preventing the movement of said piston relative to said body.

17. A vehicle seat assembly adapted to be mounted on a floor of a vehicle comprising:
   a vehicle seat;
   a pneumatic seat adjuster including a body having a bore formed therein, the body adapted to be connected to one of a floor and said vehicle seat; and a piston slidably disposed in said bore, said piston and said body defining first and second chambers, the piston adapted to be connected to the other one of the floor and said vehicle seat;
   a source of pressurized gas;
   a valve for selectively supplying pressurized gas from said source into said first and second chambers for altering a pressure differential between said first and second chambers to cause movement of said piston relative to said body; and
   a detection system that is responsive to acceleration of said vehicle seat for altering the pressure differential between said first and second chambers to reduce peak acceleration forces acting on said vehicle seat.

18. The vehicle seat assembly of claim 17, wherein said valve selectively vents gas from said first and second chambers to atmosphere for altering the pressure differential between said first and second chambers.

19. The vehicle seat assembly of claim 17 further including a mechanical locking mechanism for preventing the movement of said piston relative to said body.

20. The vehicle seat assembly of claim 17 further including a pneumatic device pneumatically connected to said source of pressurized gas.

* * * * *